United States Patent [19]

Sugiura

[11] Patent Number: 5,763,827
[45] Date of Patent: Jun. 9, 1998

[54] ELECTRICAL JUNCTION BOX SYSTEM FOR DIVERSE VEHICLES AND ELECTRICAL JUNCTION BOX THEREFOR

[75] Inventor: Tomohiro Sugiura, Shizuoka-ken, Japan

[73] Assignee: Yazaki Corporation, Tokyo, Japan

[21] Appl. No.: 815,134

[22] Filed: Mar. 12, 1997

[30] Foreign Application Priority Data

Mar. 14, 1996 [JP] Japan .................. 8-057918

[51] Int. Cl.⁶ ............................................ H02G 3/10
[52] U.S. Cl. ................. 174/49; 220/3.8; 439/949; 361/624
[58] Field of Search .................. 174/48, 49, 50, 174/59, 52.1, 44, 17 R, 71 B, 72 B, 70 B, 88 B, 129 B, 133 B, 68.2; 361/622, 624, 626; 220/3.8, 3.92, 3.94, 4.02; 439/76.2, 949, 212, 76

[56] References Cited

U.S. PATENT DOCUMENTS

| | | |
|---|---|---|
| 4,938,719 | 7/1990 | Sawai et al. .................. 439/714 |
| 4,963,099 | 10/1990 | Sato et al. .................. 439/76.2 |
| 5,057,026 | 10/1991 | Sawai et al. .................. 439/76.2 |
| 5,626,492 | 5/1997 | Onizuka et al. .................. 439/512 |
| 5,674,090 | 10/1997 | Sumida et al. .................. 439/540.1 |

FOREIGN PATENT DOCUMENTS 5-161234  6/1993  Japan .

*Primary Examiner*—Kristine L. Kincaid
*Assistant Examiner*—Dhiru R. Patel
*Attorney, Agent, or Firm*—Finnegan, Henderson, Farabow, Garrett & Dunner, L.L.P.

[57] ABSTRACT

For a first vehicle kind requiring a first internal circuit to have a first connection circuit for connection of a first set of electrical inserts or a second vehicle kind requiring a second internal circuit to have a second connection circuit for connection of a second set of electrical inserts, the first and second connection circuits being different from each other, a case member is molded with external portions for installation of a corresponding one of the first and second sets of electrical inserts and an internal space including a channel network, and has installed in the internal space the first internal circuit with a first connection circuit composed of a combination of first bus bars set in the channel network, or the second internal circuit with the second connection circuit composed of a combination of second bus bars set in the channel network.

11 Claims, 8 Drawing Sheets

ELECTRICAL JUNCTION BOX SYSTEM FOR DIVERSE VEHICLES AND ELECTRICAL JUNCTION BOX THEREFOR

BACKGROUND OF THE INVENTION

1. Field of the Invention

The present invention generally relates to an electrical junction box system for various kinds of vehicles, and particularly, it relates to an electrical junction box system including: a first junction box for electrical connection in a kind of vehicle, e.g. a vehicle with a steering wheel at a left side thereof; and a second junction box for electrical connection in another kind of vehicle, e.g. a vehicle with another that steering wheel at a right side thereof while the remaining specifications of this vehicle are substantially identical to that vehicle.

The invention further relates to an electrical junction box for such a system, the electrical junction box being of the type that includes a molded casing body or housing assembly (hereafter collectively "case member") configured to provide: a plurality of external portions for electrical application, e.g. external openings for insertion of fuses, relays and/or plugs (hereafter collectively "electrical inserts"); and an internal space for installation of conductors, connectors, contacts, etc. (hereafter collectively "internal circuit") using bus bars for branchable interconnections among the electrical inserts.

2. Description of Relevant Art

There are known varieties of vehicles. They have their wiring harness members including electrical junction boxes, whose internal circuits usually are different in arrangement (e.g. bus bar layout), such as by vehicle types and grades. Typically, a respective kind of vehicle has an electrical junction box designed for itself, needing a dear cost such as for molding a dedicated case member.

To reduce such a molding cost, there was provided an electrical junction box system for optionable vehicles, which system includes a basic junction box having a common case member with a common internal circuit, and varieties of optionable junction boxes having their dedicated case members with dedicated internal circuits employable in combination with, i.e., in addition to the common internal circuit, as necessary.

For a mere addition of internal circuit, an addition of an optioned junction box might have done. It however would not, for vehicles different in type and/or grade. In such a case, electric wires were necessary for connection to effect a modification of internal circuit.

Further, for a systemization of diverse grades of a type of vehicle, there has been proposed an electrical junction box shown in FIG. 1, which includes a molded case member composed of an upper case 1 and a lower case 4, which cases 1, 4 cooperatively define an internal space for installation of a basic internal circuit 2 and a high-grade dedicated internal circuit 3.

The basic circuit 2 is formed on a pair of upper and lower lamination substrates 2a, 2b; and the dedicated circuit 3, on a dedicated lamination substrate. The internal circuits 2, 3 are constituted by using horizontal bus bars 2c, 3a, whose end parts are bent to stand upright as terminals, extending through openings 2d, 2e that are formed in substrates 2a, 2b on the way for the terminals to gain access toward external application portions 1a, 1b, 1c, 1d, as they are formed on the upper case 1 for application of unshown electrical inserts. The application portions 1a–1d have their positions staggered in correspondence to terminals formed at ends of associated horizontal bus bars.

The electrical junction box of FIG. 1 is employed also for a moderate grade vehicle that does not need the high-grade dedicated circuit 3. In this case, the dedicated circuit 3 becomes futile, resulting in the dearer production cost.

SUMMARY OF THE INVENTION

The present invention has been achieved with such points in mind.

It therefore is a first object of the present invention to provide an electrical junction box system for diverse vehicles needing different internal circuits, achieving a reduced molding cost, permitting a reduced production cost.

It is a second object of the invention to provide an electrical junction box adaptive for such a system.

To achieve the first object, a first aspect of the invention provides an electrical junction box system (5) for a first vehicle kind requiring a first internal circuit (11) to have a first connection circuit (130) for connection of a first set of electrical inserts (Fa, Ra) and a second vehicle kind requiring a second internal circuit (12) to have a second connection circuit (140) for connection of a second set of electrical inserts (Fb, Rb), the first and second connection circuits (130, 140) being different from each other, the electrical junction box system (5) including: a first junction box (5a) comprising a case member (10) molded for defining a plurality of external portions (6, 8) for installation of the first set of electrical inserts (Fa, Ra) and an internal space including a channel network (16), and the first internal circuit (11) installed in the internal space, with the first connection circuit (130) composed of a combination of first bus bars (13) set in the channel network; and a second junction box (5b) comprising another said case member (10) defining said plurality of external portions (6, 8) for installation of the second set of electrical inserts (Fb, Rb), and the second internal circuit (12) installed in said internal space of said another case member (10), with the second connection circuit (140) composed of a combination of second bus bars (14) set in said channel network (16) of said another case member (10).

According to the first aspect, an electrical junction box system is provided for diverse vehicles covering a first vehicle kind and a second vehicle kind. The electrical junction box system includes a first junction box for application to the first vehicle kind and a second junction box for application to the second vehicle kind. The first junction box comprises a case member and a first internal circuit including a first connection circuit. The second junction box comprises a case member and a second internal circuit including a second connection circuit that is different from the first connection circuit. This and that case members are identical to each other, and each have a plurality of external installation portions and an internal space including a channel network. The internal space is for installation of a corresponding one of the first and second internal circuits, and the channel network is for insetting a corresponding one of the first and second connection circuits.

On the other hand, some circuit for the first vehicle kind includes the first internal circuit, and a first set of electrical inserts to be connected by the first connection circuit as part of the first internal circuit. Some circuit for the second vehicle kind includes the second internal circuit, and a second set of electrical inserts to be connected by the second connection circuit as part of the second internal circuit. A remaining part of the second internal circuit may be identical to or different from a remaining part of the first internal circuit, as the first and second internal circuits are each permitted to be installed in the internal space. Likewise, the second set of electrical inserts may be identical to or different from the first set of electrical inserts, in number and/or characteristics.

In application of the system to the first vehicle kind, the first set of electrical inserts are installed in corresponding ones of the plurality of external portions.

In application to the second vehicle kind, the second set of electrical inserts are installed in corresponding ones of the plurality of external portions.

Accordingly, the case member is permitted to serve as a common member, and can be molded by using a mold.

According to a second aspect of the invention, as it depends from the first aspect: the first set of electrical inserts (Fa, Ra; Fb, Rb) comprise a number of upstream insert members (Ra; Rb) and a number of downstream insert members (Fa; Fb); and the plurality of external portions (6, 8) comprise a first series (7) of housing parts (6) aligned to a first reference line (y−1) and adapted for accommodation of the number of upstream insert members (Ra, Rb), and a second series (9) of housing parts (8) aligned to a second reference line (y−N) parallel to the first reference line (y−1) and adapted for accommodation of the number of downstream insert members (Fa; Fb).

According to the second aspect, a number of upstream insert members and a number of downstream insert members are aligned in parallel in an opposing manner, allowing an alignment of serially connectable terminals for those members as well as for these members, permitting a smaller number of bus bars to be arranged for interconnection in a simplified manner.

According to a third aspect of the invention, as it depends from the second aspect, the upstream insert members each comprise a relay member (Ra; Rb).

According to a fourth aspect of the invention, as it depends from the second aspect, the downstream insert members each comprise a fuse member (Fa; Fb).

According to a fifth aspect of the invention, as it depends from the second aspect, the first set of electrical inserts further comprise a number of power supply inserts (B-24, B-35, A-13, A-17; B-34, B-35, A-17), and the case member (10) has a third series of housing parts aligned to a third reference line (y−(j+1)) parallel to the first reference line (y−1) and adapted for accommodation of the number of power supply inserts.

According to the fifth aspect, a number of power supply inserts as most upstream members are aligned in parallel to the number of upstream insert members and the number of downstream insert members.

According to a sixth aspect of the invention, as it depends from the fifth aspect, the channel network (160) comprises a first channel (160-1) extending along a first reference plane including the first reference line (y−1), a second channel (160-2, 160-3) extending along a second reference plane including the second reference line (y−N), a third channel (160-4, 160-5, 160-6, 160-7, 160-8) extending along a third reference plane including the third reference line (y−(j+1)), a number of fourth channels (160-10, 160-12) for intercommunication between the first channel (160-1) and the second channel (160-2, 160-3), and a number of fifth channels (160-13, 160-14, 160-15, 160-16, 160-17) for intercommunication between the first channel (160-1) and the third channel (160-4, 160-5, 160-6, 160-7, 160-8).

According to the sixth aspect, in a plan view, a first channel extending in an alignment direction of upstream insert members communicates with a second channel extending in an alignment direction of downstream insert members, and with a third channel extending in an alignment direction of power supply inserts as the most upstream insert members.

According to a seventh aspect of the invention, as it depends from the sixth aspect, the combination of first bus bars (13; 14) includes a first bus bar member (13a 13b; 14a) passing the first channel, one of the number of fourth channels, and the second channel, and a second bus bar member (13c, 13d, 13e, 13f, 13g; 14c, 14d, 14e, 14f) passing the first channel, one of the number of fifth channels, and the third channel.

According to an eighth aspect of the invention, as it depends from the first aspect, the combination of first bus bars (13; 14) each comprise a vertical bus bar member.

Further, to achieve the second object, a ninth aspect of the invention provides an electrical junction box (5) for a first vehicle kind requiring a first internal circuit (11) to have a first connection circuit (130) for connection of a first set of electrical inserts (Fa, Ra) and a second vehicle kind requiring a second internal circuit (12) to have a second connection circuit (140) for connection of a second set of electrical inserts (Fb, Rb), the first and second connection circuits (130, 140) being different from each other, the electrical junction box (5) comprising: a case member (10) molded for defining a plurality of external portions (6, 8) for installation of a selective one of the first and second sets of electrical inserts (Fa, Ra; Fb, Rb), and an internal space including a channel network (16); the first internal circuit (11) being adapted to be installed in the internal space, with the first connection circuit (130) composed of a combination of first bus bars (13) set in the channel network; and the second internal circuit (12) being adapted to be installed in the internal space, with the second connection circuit (140) composed of a combination of second bus bars (14) set in the channel network (16).

According to the ninth aspect, an electrical junction box permits the provision of a system according to the first aspect.

According to a tenth aspect of the invention, as it depends from the ninth aspect, the case member comprises a casing body (10) of a box form, said selective one of the first and second sets of electrical inserts (Fa, Ra; Fb, Rb) comprises a number of relay members (Ra; Rb) and a number of fuse members (Fa; Fb), and the plurality of external portions (6, 8) comprise a first series (7) of housing parts (6) aligned in a longitudinal direction of the casing body (10) and adapted for installation of the number of relay members (Ra; Rb) and a second series (9) of housing parts (8) aligned in parallel to the first series (7) of housing parts (6) and adapted for installation of the number of fuse members (Fa; Fb).

According to an eleventh aspect of the invention, as it depends from the tenth aspect, the first and second connection circuits (130; 140) each include a bus bar member (13b; 14a) having an elongate base portion (22) set at a relay connection part thereof in a first channel (160-1) of the channel network (16) facing the number of relay members (Ra; Rb), and at a fuse connection part thereof in a second channel (160-3) of the channel network (16) facing the number of fuse members (Fa; Fb), the elongate base portion having an interconnection part interconnecting the relay connection part and the fuse connection part.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
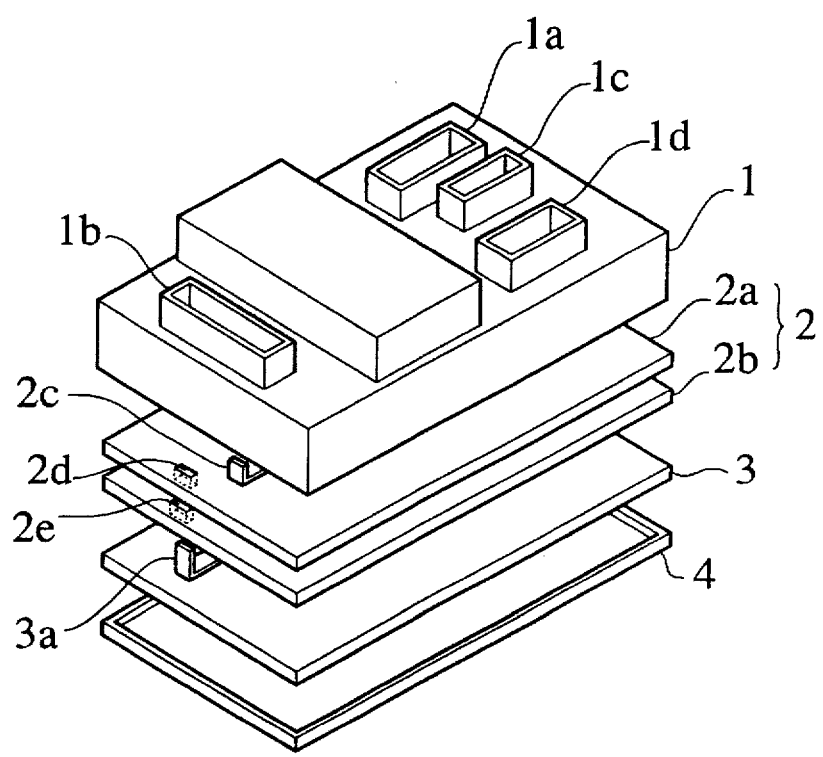
FIG. 1 is an exploded view of a conventional electrical junction box.

There will be detailed below the preferred embodiments of the present invention with reference to the accompanying drawings: FIG. 2 to FIG. 8, in which like members are designated by like reference characters.

Figure 2:
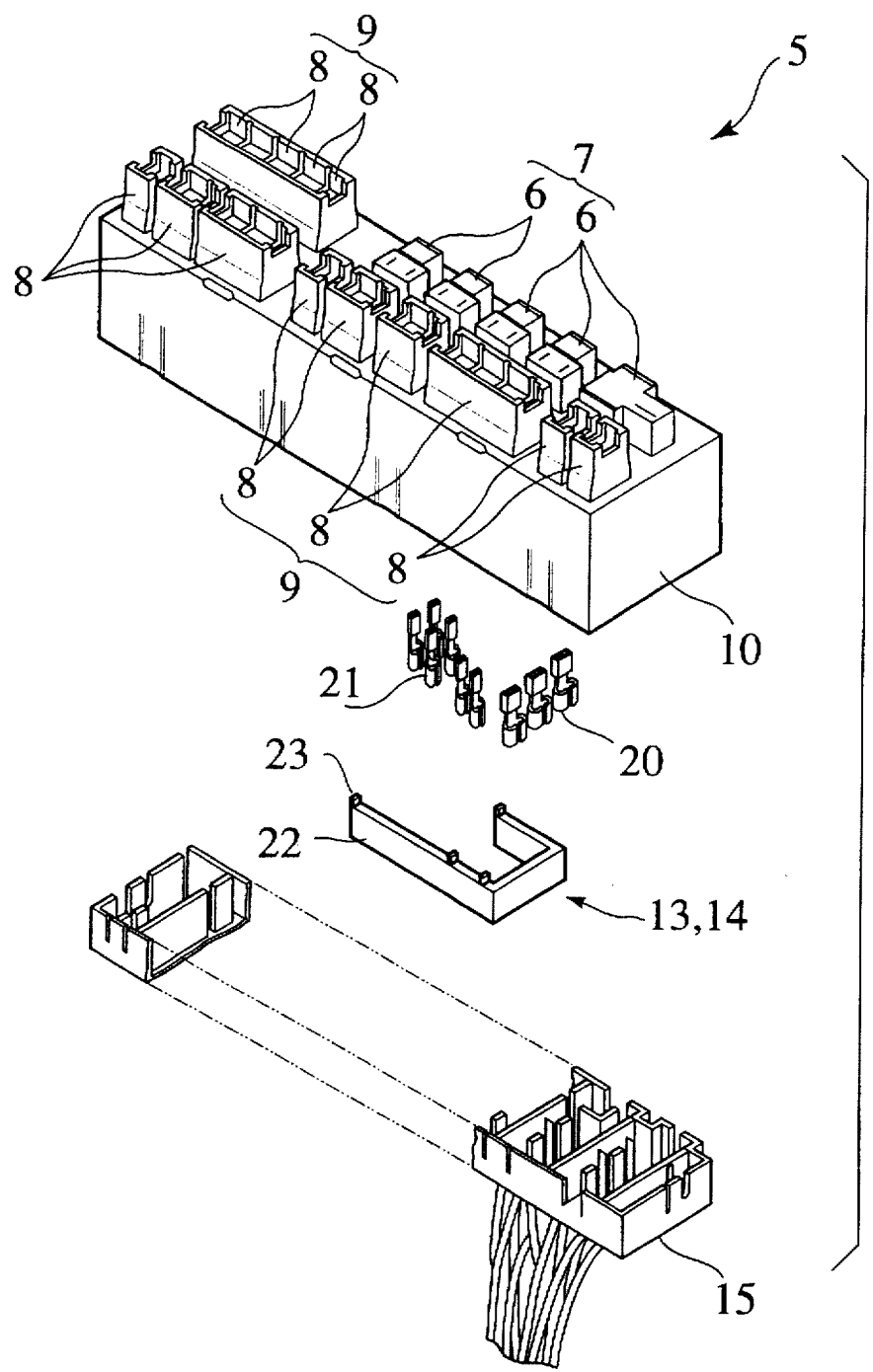
FIG. 2 is an exploded view, cut in part, of an electrical junction box for an electrical junction box system according to an embodiment of the invention.

FIG. 2 shows principal components of an electrical junction box system 5 for diverse vehicles, covering a first vehicle kind in which a driver may be left seated and a second vehicle kind in which a driver may be right seated.

Figure 6A:
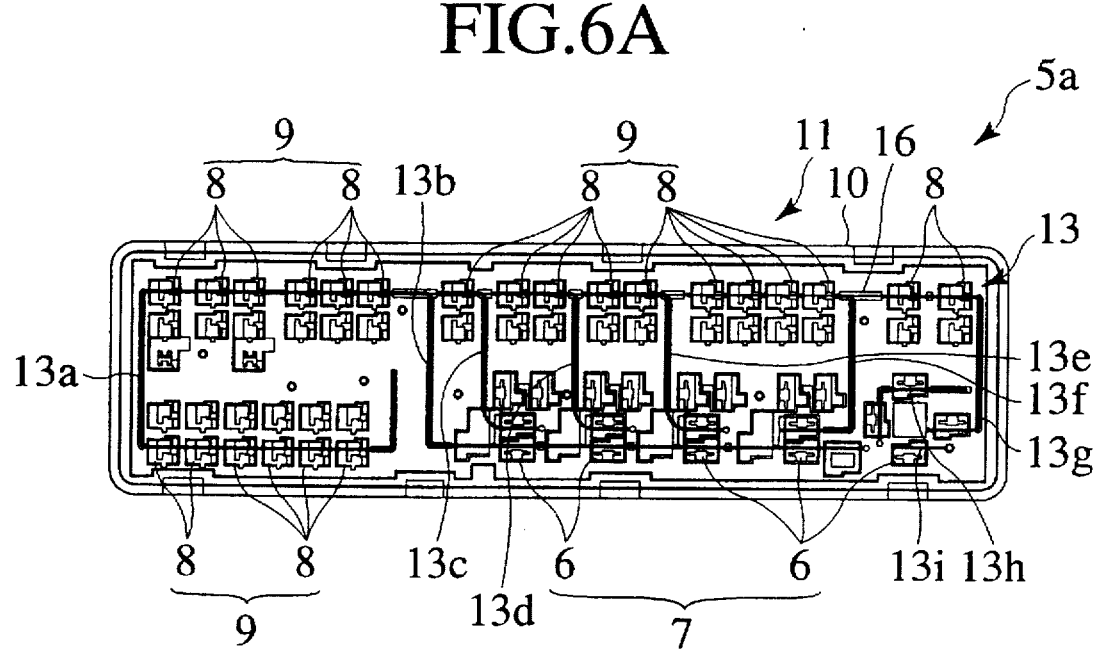
FIGS. 6A and 6B are detailed views of FIGS. 5A and 5B, respectively.
Figure 6B:
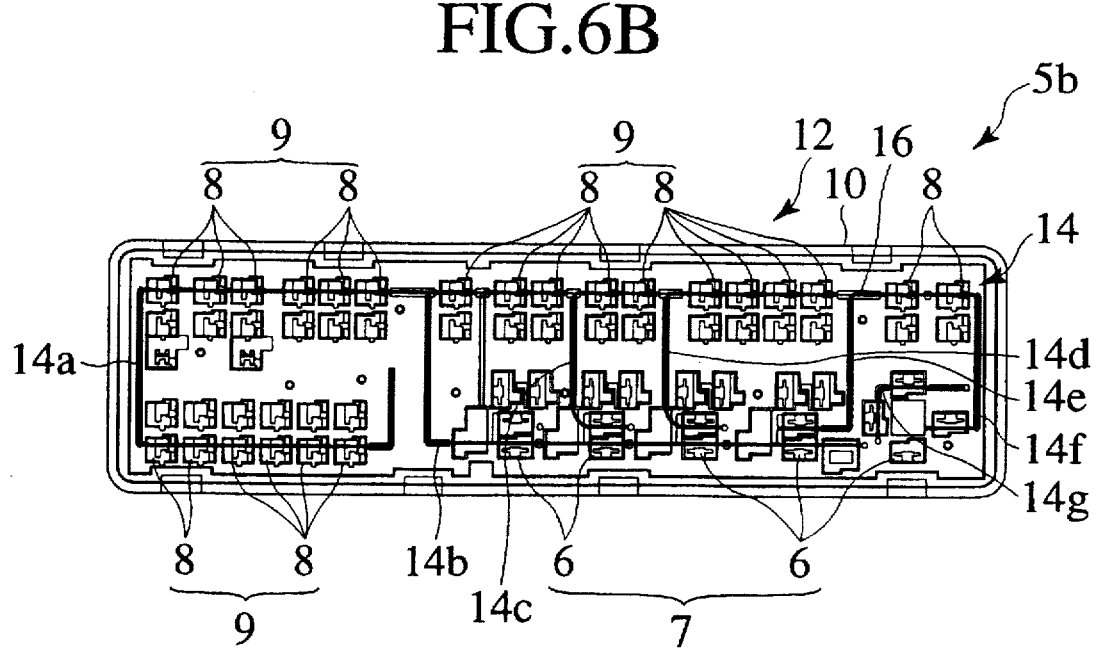

As partly shown in FIGS. 6A and 6B, the electrical junction box system 5 includes in a line thereof a first junction box 5a for application to the first vehicle kind and a second junction box 5b for application to the second vehicle kind.

The first junction box 5a comprises: a molded case member 10+15 (hereafter sometimes simply "10") composed of a main or upper case 10 as a casing body and a lower case 15 (FIG. 2) that may be modified by vehicle kinds; and a first internal circuit 11 (FIG. 7A) including a first connection circuit 130 (FIG. 5A) comprised of vertical bus bars 13a to 13l each having an elongate base portion 22 (FIG. 2) and terminals 23 extending parallel thereto.

The second junction box 5b comprises: an identical case member 10+15; and a second internal circuit 12 (FIG. 7B) including a second connection circuit 140 (FIG. 5B) comprised of vertical bus bars 14a to 14g each having an elongate base portion 22 and parallel terminals 23. The second connection circuit 140 is different from the first connection circuit 130.

Figure 3:
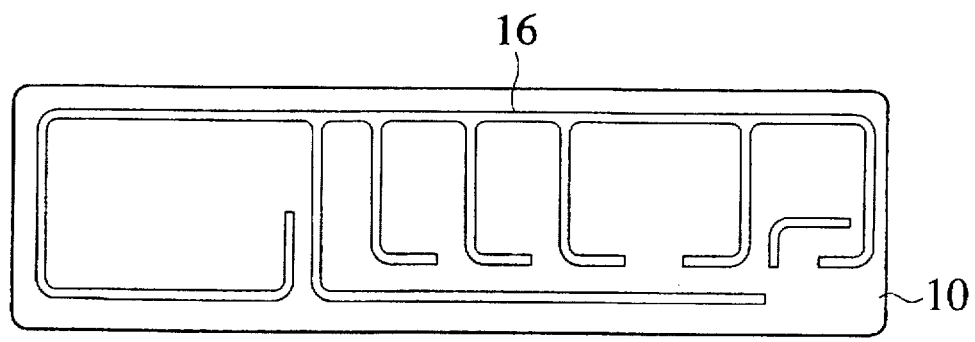
FIG. 3 is a bottom view of a channel network in a case member of the electrical junction box of FIG. 2.

This and that case members 10 each have a plurality of external installation portions 6, 8 (FIGS. 2; 6A, 6B; reference numerals 6, 8 are representative of associated power supply points, as necessary) and an internal space defined between the upper and lower cases 10, 15, which internal space includes a channel network 16 (FIG. 3). The internal space is for installation of a selective one of the first and second internal circuits 11, 12, and the channel network 16 is for insetting a corresponding one of the first and second connection circuits 130, 140.

On the other hand, some circuit (FIG. 7A) for the first vehicle kind includes: the first internal circuit 11; and a first set of electrical components such as relays Ra, fuses Fa, and connectors or terminals or plugs (hereafter collectively "connectors") A1 to A17 and B18 to B20, B25 to B35, including power supply connectors B-24, B-35, A-13, A-17, to be directly or indirectly connected by the first connection circuit 130 that constitutes part of the first internal circuit 11. The first set of electrical components includes a first set of electrical inserts consisting of the relays Ra, fuses Fb, and power supply connectors B-24, B-35, A-13, A-17.

Some circuit (FIG. 7B) for the second vehicle kind includes: the second internal circuit 12; and a second set of electrical components such as relays Rb, fuses Fb, and various connectors A1, A2, A4 to A17 and B18 to B35, including power supply connectors B-34, B-35, A-17, to be directly or indirectly connected by the second connection circuit 140 that constitutes part of the second internal circuit 12. The second set of electrical components includes a second set of electrical inserts consisting of the relays Rb, fuses Fb, and power supply connectors B-34, B-35, A-17.

In application of the system 5 to the first vehicle kind, the first set of electrical inserts are installed in corresponding ones of the plurality of external portions 6, 8. In application to the second vehicle kind, the second set of electrical inserts are installed in corresponding ones of the plurality of external portions 6, 8.

Accordingly, at least the main case 10 is permitted to serve as a common member, and can be molded by using a mold.

The first set of electrical inserts includes a total of five relays Ra as upstream insert members, and a total of 23 fuses Fa of which 13 are insert members provided downstream of the five relays Ra, while the remaining 8 are placed downstream of the power supply connector B-24. The second set of electrical inserts includes a total of four relays Rb as upstream insert members, and a total of 23 fuses Fb of which 8 are provided downstream of the four relays Rb, while the remaining 15 are placed downstream of the power supply connector B-34.

As shown in FIG. 2, the plurality of external portions 6, 8 include: a first series 7 of housing parts 6 aligned along a rear long side of a right part of the box-shaped main case 10 and adapted for accommodation of at most five of a total of nine (=5+4) relays Ra. Rb; a second series 9 of housing parts 8 aligned along a front long side of the right part of the main case 10 and adapted for accommodation of at most 13 of a total of 21 (=13+8) fuses Fa, Fb downstream of relays; a pair of front and rear series 9 of housing parts 8 aligned along front and rear long sides of a left part of the main case 10 and adapted for accommodation of at least 25 fuses Fa, Fb downstream of power supply connectors; and a series of connector housing parts aligned in parallel to the first and second series 7, 9 of housing parts, placed in between, and adapted for a mating with at most four of a total of seven (=4+3) power supply connectors.

The case member 10 is designed in a three-dimensional design field defined by an X-Y-Z coordinate system.

Figure 8:
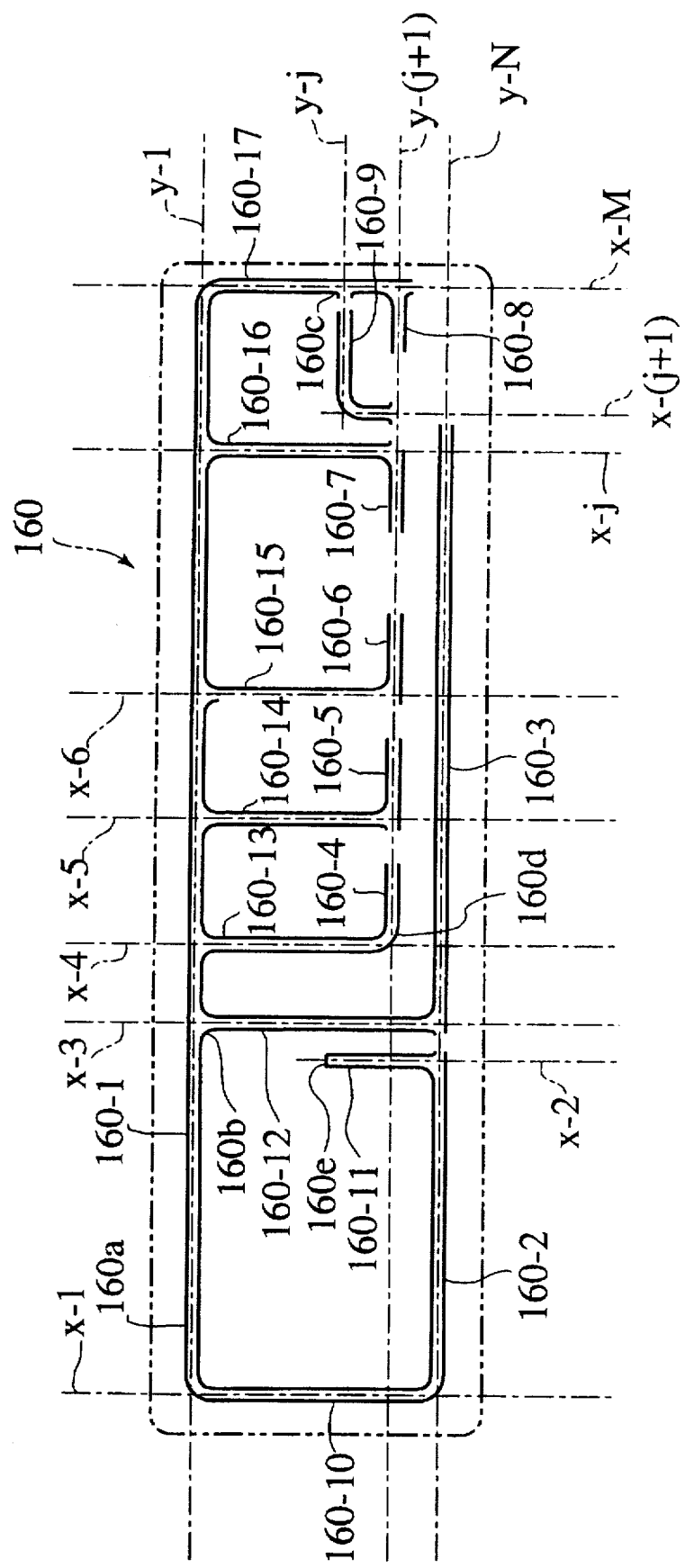
FIG. 8 is an illustration describing a layout concept of the channel network of FIG. 3.

FIG. 8 has mapped the case member 10 in the design field, where it is observed along an unshown Z-axis. The design field has a plurality of longitudinal reference planes each parallel to an X-Z plane and representative by an associated y-coordinate or by a straight line passing the y-coordinate, and a plurality of transverse reference planes each parallel to a Y-Z plane and representative by an associated x-coordinate or by a straight line passing the x-coordinate. The longitudinal reference planes as well as the transverse reference planes are disposed at various intervals, meeting associated standards and requirements.

In the design field, the case member 10 has an imaginary channel network 160 continuously prescribed along adequate ones (y-1, . . . , y-j, y-(j+1), . . . , y-M; x-1, . . . , x-j, x-(j+1), . . . , x-M) of the longitudinal and transverse reference planes, including straight channels 160a, corners 160b of a specified radius of curvature, intentional breaks 160c for communication that can be shut, bend channels 160d with the specified radius of curvature, and bus bar locking channels 160e to thereby provide channels 160-1 to 160-17 of which a total corresponds to the channel network 16, subject to closed breaks and ends which may be left open for better communications.

Further, the accompanying drawings concurrently disclose an electrical junction box 5 for the described system in accordance with the invention.

As shown in FIG. 2, the junction box 5 includes: a relay fitting group 7 comprised of a set of relay fitting parts 6 for fitting relays; fuse fitting groups 9 comprised of a set of fuse fitting parts 8 for fitting fuses; a casing body 10 of a rectangular parallelepiped form provided with the relay fitting group 7 and the fuse fitting groups 9; a set of bus bars 13a–13l, 14a–14g (an exemplary one is shown in FIG. 2) to be incorporated in the casing body 10 to constitute power distributing branch circuits 11, 12 (FIGS. 7A, 7B); connectors or terminals 20, 21 for connections between the bus bars and terminals of fuses and relays; and an under cover as a lower case 15.

As shown in FIGS. 6A, 6B, the junction box 5 has the relay fitting group 7 disposed at one side of the casing body 10, with the relay fitting parts 6 aligned in series, and the fuse fitting groups 9 disposed at both sides of the casing body 10, with their fuse fitting parts 8 aligned in series. Between the relay fitting group 7 and the fuse fitting groups 9 as well as between the fuse fitting groups 9, there are provided bus bar installation channels or grooves (as arrangement path) 16 formed in the casing body 10 for setting therein the bus bars 13a–13i, 14a–14g.

As shown in FIG. 3, the bus bat installation channel 16 is continuously formed between fuse fitting parts 8, as well as between the relay fitting parts 6 and the fuse fitting parts 8. In the bus bar installation channel 16 are set in position the bus bars 13a–13i of FIG. 6A to constitute the power distribution circuit 11 (FIG. 7A), and the bus bars 14a–14g of FIG. 6B to constitute the power distribution circuit 12 (FIG. 7B).

The bus bars 13a–13i have different forms to the bus bars 14a–14g so that the distribution circuit 11 formed by the those bus bars is different in circuit configuration from the distribution circuit 12 formed by these bus bars, as they are set in the bus bar installation channel 16.

Figure 4A:
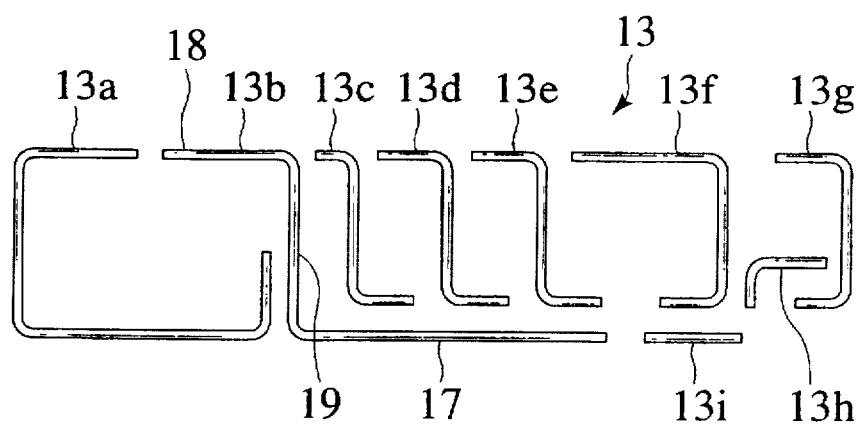
FIGS. 4A and 4B illustrate a total number of first bus bars and that of second bus bars, respectively, to be either set in the channel network of FIG. 3.
Figure 4B:
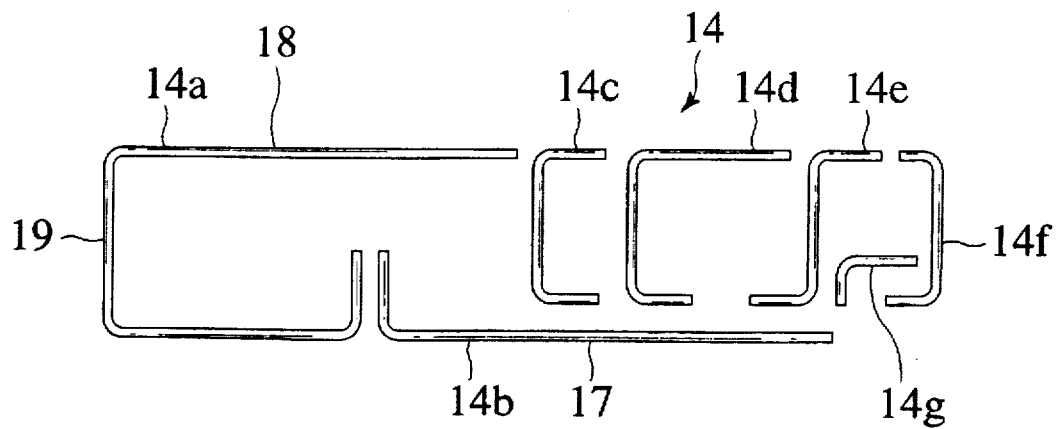

As shown in FIGS. 4A, 4B, a plurality of kinds of different bus bars 13a–13i, 14a–14g have a basic form comprised of a relay side base portion 17 to be inserted in a relay fitting part 6, a fuse side basic portion 18 to be inserted in a fuse fitting part 8, and a connecting base portion 19 for interconnection between the relay side base portion 17 and the fuse side base portion 19, while the relay side base portion 17 is different in length from the fuse side base portion.

Figure 5A:
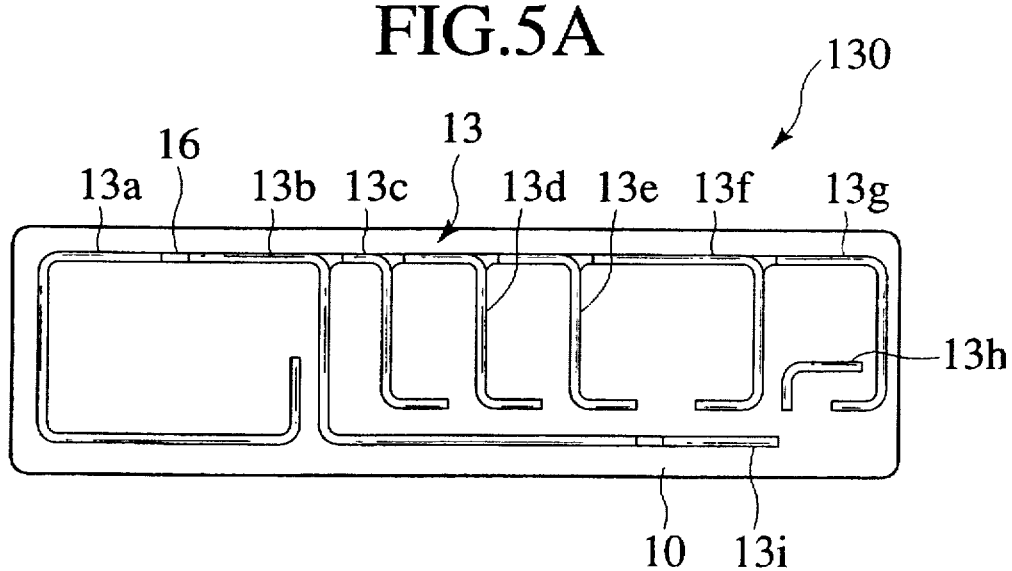
FIGS. 5A and 5B show the first bus bars and the second bus bars, as they are set in the channel network of the case member of FIG. 3, respectively.
Figure 7A:
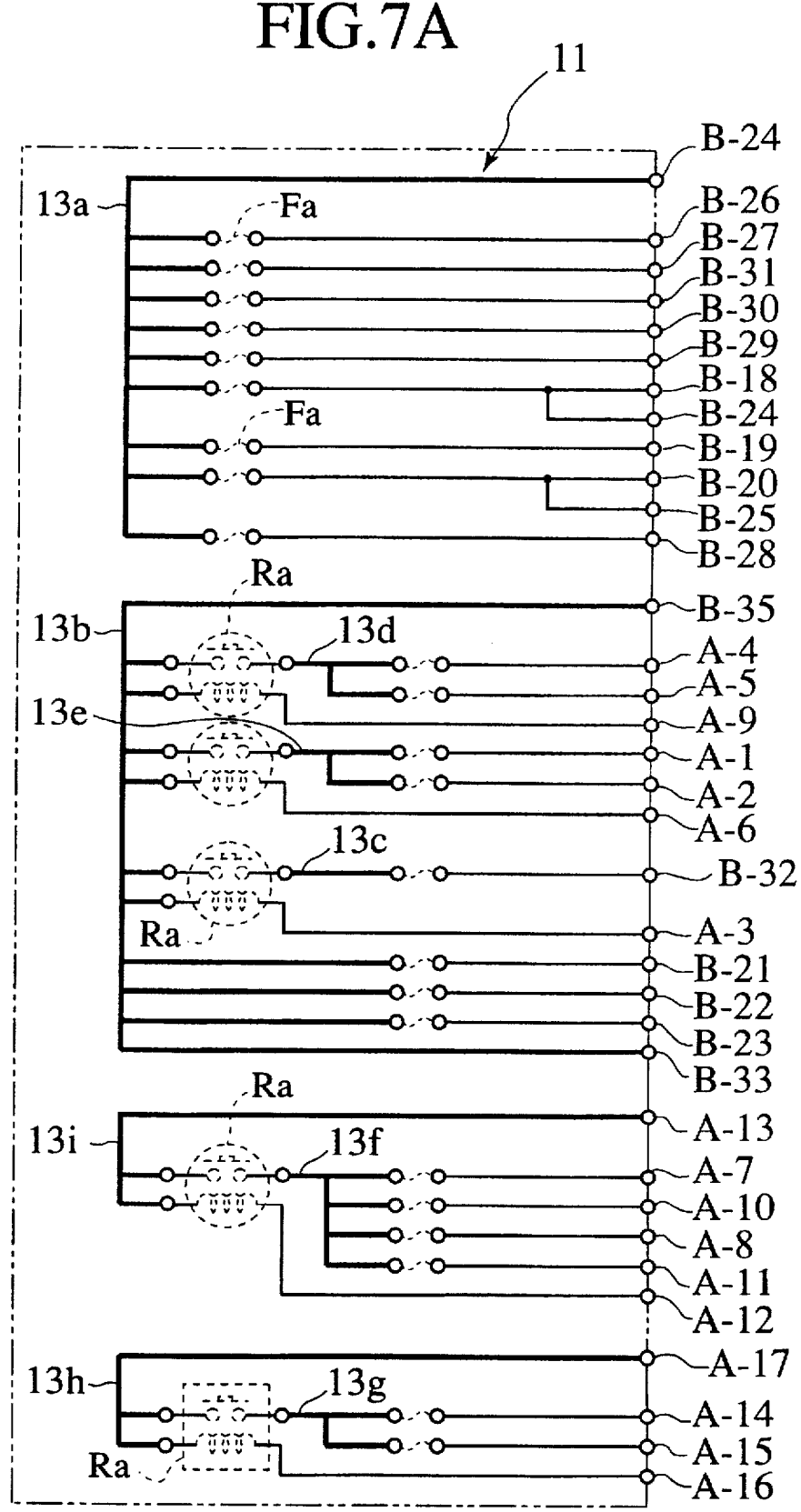
FIGS. 7A and 7B are circuit diagrams of a first internal circuit and a second internal circuit, respectively.
Figure 7B:
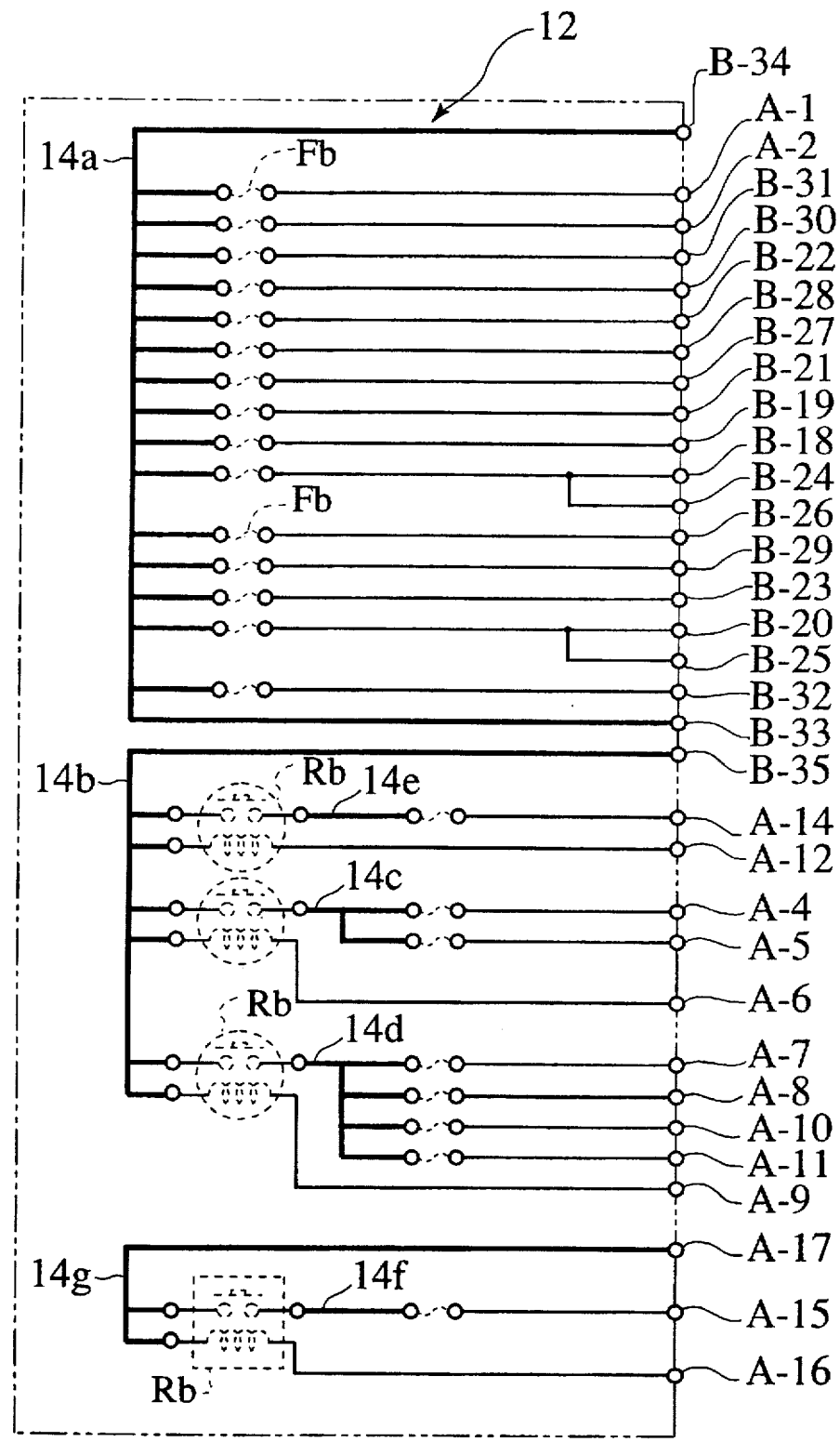

The bus bars 13a–13i of FIG. 4A are set in the bus bar installation channel 16 in a layout shown in the figure, to be arranged as in FIG. 5A to constitute the power distribution circuit 11 of FIG. 7A.

Figure 5B:
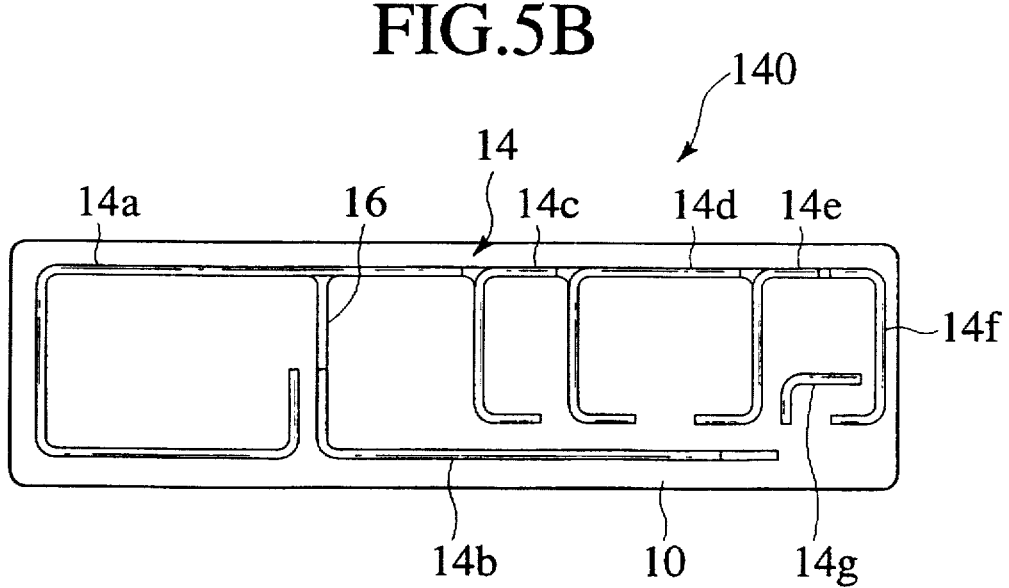

Likewise, the bus bars 14a–14g of FIG. 4B are set in the bus bar installation channel 16 in a layout shown in the figure, to be arranged as in FIG. 5B to constitute the power distribution circuit 12 of FIG. 7B.

FIG. 5A illustrates the bus bar installation channel 16 and the bus bars 13a–13i set therein, as they are picked up from the view of FIG. 6A. FIG. 5B illustrates the bus bar installation channel 16 and the bus bars 14a–14g set therein, as they are picked up from the view of FIG. 6B.

The power distribution circuits 11, 12 of FIGS. 7A, 7B are installed in the case member 10 in a following manner.

For the distribution circuit 11 of FIG. 7A to be built in the case member 10, the bus bars 13a–13i of FIG. 4A are set in the bus bar installation channel 16 as shown in FIG. 5A, in the layout of FIG. 4A, to have an installation state of FIG. 6A, where they interconnect the relay fitting group 7 with the fuse fitting groups 9, and one fuse fitting group 9 with the other fuse fitting group 9.

For the distribution circuit 12 of FIG. 7B to be built in the case member 10, the bus bars 14a–14g of FIG. 4B are set in the bus bar installation channel 16 as shown in FIG. 5B, in the layout of FIG. 4A, to have an installation state of FIG. 6B, where they interconnect the relay fitting group 7 with the fuse fitting groups 9, and one fuse fitting group 9 with the other fuse fitting group 9.

According to the embodiment, an electrical junction box 5 has a bus bar installation channel 16 formed in a casing body 10, which channel 16 allows different bus bar sets 13a–13i, 14a–14g to be arranged therein, permitting different distribution circuits 11, 12 to be constituted. Therefore, a single casing body 10 can do for provision of branch circuits to be different by vehicle types, grades and/or kinds.

Moreover, a single kind of casing body 10 is permitted to provide different branch circuits by a mere substitution of a set of bus bars 13a–13i with another set of bus bars 14a–14g, so that a total number of kinds of casing body can be reduced. Therefore, for a molding of casing body, a total number of molds can also be reduced. Further, in fabrication of junction box, the line can cope with employment of a casing body 10 simply by a modification of machine for insertion of bus bars 13a–13i, 14a–14g, permitting a significant cost effect to be achieved.

While preferred embodiments of the present invention have been described using specific terms, such description is for illustrative purposes, and it is to be understood that changes and variations may be made without departing from the spirit or scope of the following claims.

What is claimed is:

1. An electrical junction box system for a first vehicle kind requiring a first internal circuit to have a first connection circuit for connection of a first set of electrical inserts and a second vehicle kind requiring a second internal circuit to have a second connection circuit for connection of a second set of electrical inserts, the first and second connection circuits being different from each other, the electrical junction box system including:

a first junction box comprising:
 a case member molded for defining a first plurality of external portions for installation of the first set of electrical inserts and an internal space including a channel network; and
 the first internal circuit installed in the internal space, with the first connection circuit composed of a combination of first bus bars set in the channel network; and a second junction box comprising:
 another said case member defining a second plurality of external portions for installation of the second set of electrical inserts; and
 the second internal circuit installed in an internal space of said another case member, with the second connection circuit composed of a combination of second bus bars set in said channel network.

2. An electrical junction box system according to claim 1, wherein:

the first set of electrical inserts comprise a number of upstream insert members and a number of downstream insert members; and the first plurality of external portions comprise a first series of housing parts aligned to a first reference line and adapted for accommodation of the number of upstream insert members, and a second series of housing parts aligned to a second reference line parallel to the first reference line and adapted for accommodation of the number of downstream insert members.

3. An electrical junction box system according to claim 2, wherein the upstream insert members each comprise a relay member.

4. An electrical junction box system according to claim 2, wherein the downstream insert members each comprise a fuse member.

5. An electrical junction box system according to claim 2, wherein:

the first set of electrical inserts further comprise a number of power supply inserts; and the case member has a third series of housing parts aligned to a third reference line parallel to the first reference line and adapted for accommodation of the number of power supply inserts.

6. An electrical junction box system according to claim 5, wherein the channel network comprises:

a first channel extending along a first reference plane including the first reference line;

a second channel extending along a second reference plane including the second reference line;

a third channel extending along a third reference plane including the third reference line;

a number of fourth channels for intercommunication between the first channel and the second channel; and a number of fifth channels for intercommunication between the first channel and the third channel.

7. An electrical junction box system according to claim 6, wherein the combination of first bus bars includes:

a first bus bar member passing through the first channel, one of the number of fourth channels, and the second channel; and a second bus bar member passing through the first channel, one of the number of fifth channels, and the third channel.

8. An electrical junction box system according to claim 1, wherein the first bus bars each comprise a vertical bus bar member.

9. An electrical junction box for a first vehicle kind requiring a first internal circuit to have a first connection circuit for connection of a first set of electrical inserts and a second vehicle kind requiring a second internal circuit to have a second connection circuit for connection of a second set of electrical inserts, the first and second connection circuits being different from each other, the electrical junction box comprising:

a case member molded for defining a plurality of external portions for installation of a selective one of the first and second sets of electrical inserts, and an internal space including a channel network;

the first internal circuit being adapted to be installed in the internal space, with the first connection circuit composed of a combination of first bus bars set in the channel network; and the second internal circuit being adapted to be installed in the internal space, with the second connection circuit composed of a combination of second bus bars set in the channel network.

10. An electrical junction box according to claim 9, wherein:

the case member comprises a casing body of a box form;

said selective one of the first and second sets of electrical inserts comprises a number of relay members and a number of fuse members; and the plurality of external portions comprise a first series of housing parts aligned in a longitudinal direction of the casing body and adapted for installation of the number of relay members and a second series of housing parts aligned in parallel to the first series of housing parts and adapted for installation of the number of fuse members.

11. An electrical junction box according to claim 10, wherein the first and second connection circuits each include a bus bar member having an elongate base portion set at a relay connection part thereof in a first channel of the channel network facing the number of relay members, and at a fuse connection part thereof in a second channel of the channel network facing the number of fuse members, the elongate base portion having an interconnection part interconnecting the relay connection part and the fuse connection part.

* * * * *

UNITED STATES PATENT AND TRADEMARK OFFICE
CERTIFICATE OF CORRECTION

PATENT NO. : 5,763,827
DATED : June 09, 1998
INVENTOR(S) : Tomohiro SUGIURA

It is certified that error appears in the above-indentified patent and that said Letters Patent is hereby corrected as shown below:

Claim 1, Column 8, line 63, before "case", delete "said".

Signed and Sealed this

Twenty-second Day of June, 1999

Attest:

Q. TODD DICKINSON

Attesting Officer

Acting Commissioner of Patents and Trademarks